United States Patent
Grinker et al.

(10) Patent No.: US 12,470,856 B2
(45) Date of Patent: Nov. 11, 2025

(54) ULTRASONIC PARTICLE REDUCTION SYSTEM FOR AN ACOUSTIC MICRO-VALVE

(71) Applicant: Apple Inc., Cupertino, CA (US)

(72) Inventors: Scott C. Grinker, Belmont, CA (US); Gokhan Hatipoglu, Santa Clara, CA (US); Peter C. Hrudey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 18/420,523

(22) Filed: Jan. 23, 2024

(65) Prior Publication Data

US 2024/0292139 A1   Aug. 29, 2024

Related U.S. Application Data

(60) Provisional application No. 63/486,603, filed on Feb. 23, 2023.

(51) Int. Cl.
*H04R 1/28* (2006.01)
*B08B 7/02* (2006.01)
(Continued)

(52) U.S. Cl.
CPC ............ *H04R 1/028* (2013.01); *B81B 7/0041* (2013.01); *B81B 2201/032* (2013.01); *H04R 2499/11* (2013.01)

(58) Field of Classification Search
CPC .......... H04R 1/02; H04R 1/025; H04R 1/028; H04R 1/28; H04R 1/2823; H04R 1/2826; H04R 1/2846; H04R 2499/11; H04R 2499/15; B81B 7/0041; B81B 7/0035; B81B 2201/032; B08B 7/02; B08B 7/026; B08B 7/028; B08B 13/00; F16K 15/14; F16K 15/16; F16K 51/00
See application file for complete search history.

(56) References Cited

U.S. PATENT DOCUMENTS 4,284,996 A * 8/1981 Greve .................. B41J 2/04593
                                                            310/317
4,716,418 A * 12/1987 Heinzl ................. B41J 2/04588
                                                            347/68
(Continued)

FOREIGN PATENT DOCUMENTS

CN    112584270 B  *  6/2023  .............. H04R 3/00
EP    4080856 B1   * 11/2023  ............ H04M 1/026
(Continued)

OTHER PUBLICATIONS

Tsai et al., "MEMS-based multiple fourier-horn silicon ultrasonic atomizer for inhalation drug delivery", received from https://ieeexplore.ieee.org/document/6293080/authors#authors, Date of Conference: Oct. 18-21, 2011, 4 pages.

*Primary Examiner* — Edgardo San Martin
(74) *Attorney, Agent, or Firm* — Aikin & Gallant, LLP

(57) ABSTRACT

A portable electronic device comprising: an enclosure having an enclosure wall that forms an interior chamber containing a transducer and a valve operable to open or close a vent to the interior chamber; and a particle removal mechanism coupled to the valve that is operable to drive particles away from the valve upon application of a current.

25 Claims, 8 Drawing Sheets

(51) Int. Cl.
  *B81B 7/00* (2006.01)
  *H04R 1/02* (2006.01)

(56) References Cited

U.S. PATENT DOCUMENTS

| | | | |
|---|---|---|---|
| 5,790,679 A * | 8/1998 | Hawker | H04R 1/288 |
| | | | 381/163 |
| 6,002,949 A * | 12/1999 | Hawker | H04M 1/605 |
| | | | 379/433.02 |
| 6,948,843 B2 | 9/2005 | Laugharn, Jr. et al. | |
| 9,185,480 B2 * | 11/2015 | Howes | H04R 1/086 |
| 9,208,769 B2 * | 12/2015 | Azmi | G10K 11/17885 |
| 9,357,299 B2 * | 5/2016 | Kwong | H04R 3/007 |
| 10,209,123 B2 * | 2/2019 | Vitt | G01H 15/00 |
| 10,425,738 B2 * | 9/2019 | Lippert | H04R 9/02 |
| 10,455,338 B2 * | 10/2019 | Ouyang | G06F 3/0484 |
| 10,469,940 B2 * | 11/2019 | Taylor | H04R 1/2826 |
| 12,026,020 B2 * | 7/2024 | Wright | G06F 1/1615 |
| 12,081,934 B2 * | 9/2024 | Hatipoglu | H04R 1/2811 |
| 12,114,127 B2 * | 10/2024 | Hatipoglu | F16K 15/16 |
| 12,267,641 B2 * | 4/2025 | Wilk | F04B 17/03 |
| 12,382,833 B2 * | 8/2025 | Luo | F16K 99/0048 |
| 2006/0198547 A1 * | 9/2006 | Hampton | H04R 1/023 |
| | | | 381/391 |
| 2008/0253579 A1 | 10/2008 | Cronin et al. | |
| 2012/0174650 A1 | 7/2012 | Ariessohn et al. | |
| 2014/0169579 A1 * | 6/2014 | Azmi | H04R 1/1083 |
| | | | 381/71.6 |
| 2017/0064429 A1 | 3/2017 | Hirsch et al. | |
| 2020/0398317 A1 * | 12/2020 | Shapoury | B03C 3/017 |

FOREIGN PATENT DOCUMENTS

| | | | |
|---|---|---|---|
| JP | 2006304021 A * | 11/2006 | |
| JP | 4783776 B2 | 9/2011 | |
| JP | 5578313 B2 * | 8/2014 | |

* cited by examiner

ULTRASONIC PARTICLE REDUCTION SYSTEM FOR AN ACOUSTIC MICRO-VALVE

RELATED APPLICATIONS

This application claims the benefit of priority of U.S. Provisional Application No. 63/486,603, filed Feb. 23, 2023, which is herein incorporated by reference.

FIELD

An aspect of the disclosure is directed to a particle reduction system for a valve, more specifically a particle reduction system including an ultrasonic actuator that deforms the valve to different mechanical modes to cause removal of particles from the valve. Other aspects are also described and claimed.

BACKGROUND

Portable communications or listening devices (e.g., smart phones, earphones, etc.) have within them one or more transducers that convert an input electrical audio signal into a sound pressure wave output that can be heard by the user, or a sound pressure wave input into an electrical audio signal. The transducer (e.g., a speaker) can be used to, for example, output sound pressure waves corresponding to the voice of a far end user, such as during a telephone call, or to output sound pressure waves corresponding to sounds associated with a game or music the user wishes to play. Due to the relatively low profile of the portable devices, the transducers also have a relatively low profile, which in turn, can reduce the acoustic volumes coupled to the transducer and make it difficult to maintain optimal sound quality. In some aspects, a valve for opening and/or closing a vent or opening to an acoustic volume coupled to the transducer may be provided to improve sound quality.

SUMMARY

An aspect of the disclosure is directed to a particle reduction or removal mechanism that can be used to reduce or remove particles which may interfere with an operation of a valve between, for example, an interior chamber or acoustic volume of a device and an environment surrounding the inner device enclosure. In other aspects, the particles may be removed from a valve between interior volumes of the enclosure. For example, in some aspects, the interior chamber or acoustic volume may be coupled to a transducer within the device and the valve may be used to open/close the interior chamber to another chamber to increase/decrease the interior chamber volume or open/close the chamber to the surrounding ambient environment. Representatively, in the case of earphones, in some cases a perfect seal (high impedance) is desired, whereas in other cases a very open path (low impedance) is desired. Representatively, in some cases, where the earphone fits relatively tightly within the ear and forms a seal with the ear canal, or at least a partial seal, users may experience an undesirable occlusion effect. For example, during active noise control (ANC) or noise cancellation, the user may want the in-ear device to be isolated with passive isolation and ANC (closed valve) but in other cases it may be desirable for transparency (open valve) so there is a more natural and lower occlusion effect when speaking. In addition, the open valve state may also be desired to provide thermal-physical comfort via moisture evaporation, extend customer wear time, and improve overall wear comfort. The valve, however, may be susceptible to small particle contamination that could interfere with valve performance. For example, in some cases small particles may accumulate on the moving component or flap of the valve (also referred to herein as a "movable component") causing stiction of the moving component or flap. This, in turn, may render the moving component or flap unable to transition between open and closed states, or require larger direct current (DC) bias voltages than the system can provide to transition the component or flap between states.

Aspects disclosed herein therefore propose a particle removal mechanism coupled to the valve to reduce or remove particles which may interfere with an operation of a valve. Representatively, the particle removal mechanism may include an actuator such as an alternating current (AC) circuit component that is added to the existing DC bias voltage required for primary operation of the valve. At specified intervals, for example putting an in-ear bud in a case, an AC voltage may be applied to the valve to transition the valve surface between a number of mechanical modes (or configurations) that remove the adhering particles. For example, the AC voltage may vibrate different areas or regions of the valve moving component or flap at the different modes. Some modes may have more acceleration at different regions of the valve than others such that the modes may be selected depending on which regions of the flap particles need to be removed from. Representatively, in some aspects, the valve may be an electrostatic micro-electromechanical system (MEMS) bi-stable valve having a flap that could be prone to particle accumulation. The flap may have primary bending modes in the 1 kHz to 3 kHz frequency range, and higher torsional modes in the ultrasonic frequency range of approximately 25 kHz to 40 kHz. The AC circuit component could therefore be used to clean or remove particles by applying frequencies within the 1 kHz to 3 kHz and/or the ultrasonic frequency range. For example, if cleaning is desired while the in-ear bud is not in use (e.g., in the case), frequencies of 1 kHz to 3 kHz could be used since there is no concern that applying a frequency in the audible range (e.g., <20 kHz) will interfere with the user experience. Cleaning, however, is also possible while the in-ear bud is in the ear by applying frequencies within the ultrasonic frequency range (e.g., approximately 25 kHz to 40 kHz) since it is inaudible by the user. In this aspect, the particle reduction or removal mechanism may be used to remove particles from the valve at any time desired by the user (e.g., within the user ear or outside of the user ear). Still further, in some aspects, the cycle time may be between approximately 500 milliseconds and 1000 milliseconds. Once removed from the valve or flap, the particle may be expelled from the system entirely or an adhesive could be provided inside of the device that could be used to trap the removed particles. In some aspects, effectiveness of the vibrations may be enhanced by matching the driving frequency at or near the structural resonances of the flap or moving component from which the particles are being removed.

Representatively, in one aspect, the disclosure is directed to a portable electronic device including an enclosure having an enclosure wall that forms an interior chamber containing a transducer and a valve operable to open or close a vent to the interior chamber; and a particle removal mechanism coupled to the valve that is operable to drive particles away from the valve upon application of a current. In some aspects, the particle removal mechanism includes an alternating current circuit operable to apply a current that deforms a moving component of the valve to at least one of a number of mechanical modes operable to remove solid particles from the valve. In some aspects, the current is within an ultrasonic frequency range. In some aspects, the current comprises a number of frequencies within the ultrasonic frequency range that are sequentially applied to deform the valve. In some aspect, the current comprises a number of frequencies within the ultrasonic frequency range that are simultaneously applied to deform the moving component. In some aspects, the valve includes an electrostatic valve having a flap that is deformed upon application of the current. In some aspects, the particle removal mechanism comprises a Fourier horn coupling the vent to an ambient environment and a piezoelectric actuator that drives a liquid particle within the Fourier horn out to the ambient environment. In some aspects, the actuator is attached to a side wall of the Fourier horn or a moving component of the valve.

In still further aspects, the disclosure is directed to a portable electronic device including an enclosure having an enclosure wall that forms an interior chamber and a port to an ambient environment, a transducer positioned within the interior chamber and dividing the interior chamber into a front volume chamber coupling a first side of the transducer to the sound output port and a back volume chamber coupled to a second side of the transducer and a valve having a moving component operable to open and close a vent to the interior chamber, the front volume chamber or the back volume chamber, and an actuator coupled to the valve and operable to actuate the moving component to deform to at least one of a number of mechanical modes operable to remove a particle from the valve. In some aspects, the actuator includes an alternating current circuit operable to generate an alternating current frequency within an ultrasonic frequency range to deform the moving component. In some aspects, the alternating current circuit sequentially applies a number of frequencies within the ultrasonic frequency range to deform the moving component. In some aspects, the alternating current circuit simultaneously applies a number of frequencies within the ultrasonic frequency range to deform the moving component. In some aspects, the number of mechanical modes includes a first mechanical mode actuated by application of an alternating current within a frequency range of from 20 kHz to 30 kHz. In some aspects, the number of mechanical modes includes a second mechanical mode actuated by application of an alternating current within a frequency range of from 30 kHz to 40 kHz. In some aspects, the number of mechanical modes includes a third mechanical mode actuated by application of an alternating current within a frequency range of from 40 kHz to 100 kHz. In some aspects, the number of mechanical modes includes a fourth mechanical mode actuated by application of an alternating current within a frequency range of from 100 kHz to 150 kHz. In some aspects, the number of mechanical modes include a fifth mechanical mode actuated by application of an alternating current within a frequency range of from 150 kHz to 200 kHz. In some aspects, the valve includes an electrostatic valve. In some aspects the device further includes a Fourier horn coupling the vent to the ambient environment and a piezoelectric actuator operable to drive a liquid within the Fourier horn out to the ambient environment. The piezoelectric actuator may be attached to a side wall of the Fourier horn and causes a displacement of the side wall that drives the liquid out to the ambient environment.

In another aspect, the disclosure includes a micro-electromechanical device comprising: a valve operable to open or close a vent to an enclosure chamber coupled to a transducer; and a particle removal mechanism coupled to the valve that is operable to drive particles away from the valve upon application of a current. In some aspects, the particle removal mechanism comprises an alternating current circuit operable to apply a current that deforms a moving component of the valve to at least one of a number of mechanical modes operable to remove solid particles from the valve. The current may be within an ultrasonic frequency range. In still further aspects, the current comprises a number of frequencies within the ultrasonic frequency range that are sequentially or simultaneously applied to deform the valve and/or moving component. In some aspects, the valve includes an electrostatic valve having a flap that is deformed upon application of the current. In some aspects, the particle removal mechanism comprises a Fourier horn coupling the vent to an ambient environment and a piezoelectric actuator that drives a liquid particle within the Fourier horn out to the ambient environment. The actuator may be attached to a side wall of the Fourier horn or a moving component of the valve.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/of" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
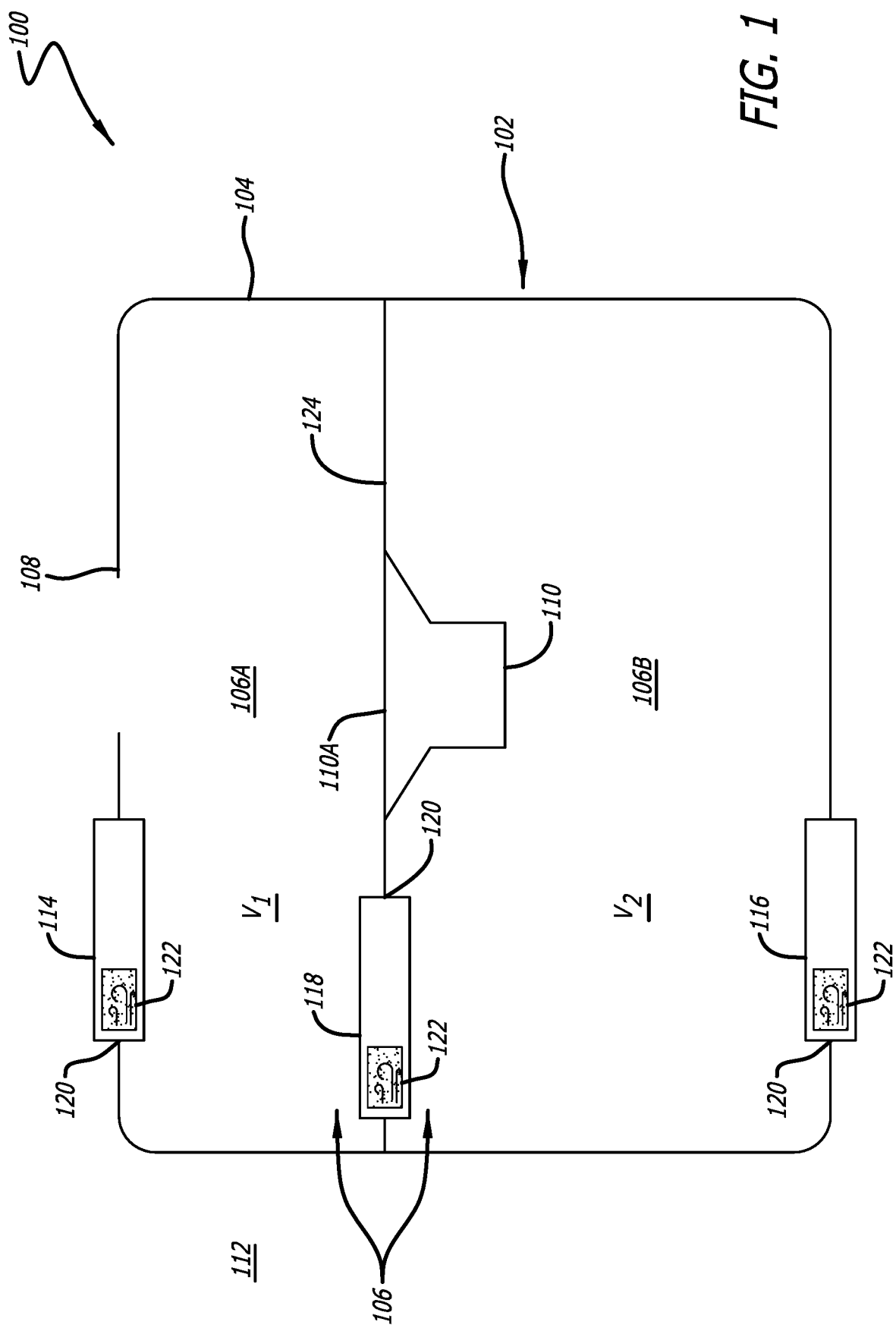
FIG. 1 illustrates a cross-sectional side view of one aspect of a portable electronic device and/or transducer assembly having a valve and a particle removal mechanism.

FIG. 1 illustrates a cross-sectional side view of one aspect of a valve assembly for a transducer positioned within a portable electronic device. The electronic device 100 may include a housing, casing or outer enclosure 102 that defines or closes off a chamber in which the constituent electronic components of electronic device 100 are contained. In some aspects, it is contemplated that device 100 may be a portable or mobile communications device, an in-ear device, portable time piece or any other device within which a transducer may be implemented. Enclosure 102 may include an enclosure wall 104 that separates a surrounding environment from an encased space or interior chamber 106 formed within enclosure 102. In some cases, the enclosure wall 104 completely isolates or seals the entire, or a portion of, interior chamber 106 from the surrounding environment. For example, the enclosure wall 104 may form a waterproof or acoustically isolated portion of interior chamber 106 which is impermeable to water and/or air. The interior chamber 106 may be of a sufficient volume and/or size to accommodate the constituent components of electronic device 100. The enclosure wall 104 may also include one or more of an acoustic port 108. The acoustic port 108 may be, for example, a sound output port through which sound from a speaker positioned within interior chamber 106 may be output. In other aspects, where a microphone is positioned near enclosure acoustic port 108, it could be a sound input port to allow for input of sound to the microphone.

Representatively, in one aspect shown in FIG. 1, enclosure acoustic port 108 is an acoustic port that is acoustically open to a transducer 110 positioned within interior chamber 106. In some aspects, transducer 110 may be any type of electroacoustic transducer capable of converting an electrical audio signal into a sound or a sound into an electrical audio signal. Representatively, transducer 110 may be a speaker or a micro-speaker, for example, a miniaturized version of a loudspeaker that uses a moving coil motor to drive sound output. Thus, in some aspects, transducer 110 may be referred to herein as a micro-speaker. In other aspects, where transducer 110 converts sound into an electrical audio signal, it may further be referred to herein as a microphone. In some aspects, transducer 110 may be coupled to an interior wall 124 and be considered to divide interior chamber 106 into a front volume chamber 106A and a back volume chamber 106B around transducer 110. In the case where transducer 110 is a speaker, front volume chamber 106A may form a chamber having a first volume (V1) around the sound output face or surface 110A of transducer 110. The front volume chamber 106A (and first volume V1) may be considered acoustically coupled to, or otherwise open to, acoustic port 108. In this aspect, sound pressure waves output from surface 110A of transducer 110 may pass through front volume chamber 106A and out to the surrounding ambient environment 112 through acoustic port 108. Back volume chamber 106B may have a second volume (V2) and surround the back side of transducer 110 (e.g., the side of transducer 110 opposite surface 110A).

It is recognized that, for example, a size, volume, pressure or other aspects of front volume chamber 106A or back volume chamber 106B may impact the acoustic performance of transducer 110. Thus, modifying the size, volume and/or pressure of front volume chamber 106A and/or back volume chamber 106B may be used to tune the acoustic performance of transducer 110. For example, in some cases, it may be desirable for front volume chamber 106A and/or back volume chamber 106B to be isolated or sealed (e.g., high impedance) from the ambient environment 112 to achieve the desired acoustic performance. In other cases, it may be desirable for front volume chamber 106A and/or back volume chamber 106B to have a very open path (e.g., low impedance) and have some amount of leak to the surrounding ambient environment 112. In still further aspects, it may be desirable for front volume chamber 106A to have a leak, or otherwise be open to, back volume chamber 106B.

With this in mind, valve assemblies or valve(s) 114, 116 and/or 118 may further be provided to vent an associated chamber. Valve 114, 116, and/or 118 may open and/or close a vent or opening 120 from front volume chamber 106A and/or back volume chamber 106B to the ambient environment 112, or a vent or opening 120 between front and back volume chambers 106A-B. Representatively, valve 114 may open and/or close opening 120 formed through wall 104 between front volume chamber 106A and ambient environment 112. In other words, when valve 114 is open, front volume chamber 106A can leak or vent to ambient environment 112 and when valve 114 is closed, the leak or venting is prevented. A leak or venting may be desired from front volume chamber 106A where, for example, device 100 is an in-ear earpiece sealed within the user's ear but a more open feel is desired. Valve 116 may open and/or close opening 120 through wall 104 between back volume chamber 106B and ambient environment 112. In other words, when valve 116 is open, back volume chamber 106B can leak or vent to the ambient environment 112, and when valve 116 is closed, the leak or venting is prevented. Valve 118 may open and/or close opening 120 through wall 124 between front volume chamber 106A and back volume chamber 106B. In this aspect, when valve 118 is open, front volume chamber 106A can leak or vent to back volume chamber 106B, and when valve 118 is closed, the leak or vent is prevented. In still further aspects, it is contemplated that one or more of valves 114, 116, 118 could be used to open and/or close an opening (e.g., opening 120) which is to another type of acoustic chamber, for example, an opening to an acoustic resonator or attenuator coupled to one or more of the previously discussed chambers or ports of the transducer.

In one aspect, one or more of valves 114, 116, 118 may be any type of valve that is operable to open and/or close the opening, for example, in response to the application of a voltage. In this aspect, valves 114, 116, 118 may be dynamically actuated to control the amount of leak. In some aspects, one or more of valves 114, 116, 118 may be micro-electromechanical systems (MEMS) actuators or valves having a moving component such as a flap that opens or closes the opening. For example, any one or more of valves 114, 116, 118 may be an electrostatic MEMS valve, a piezoelectric MEMS valve, a sliding valve, a shutter valve, or the like. Valves 114, 116, 118 may be the same, or may be different. In some aspects, one or more of valves may offer the advantages of bistability, low power consumption switching from on/off states, digitization for controlling a percentage or amount of open area for venting, and/or silent operation.

In addition, as previously discussed, one or more of valves 114, 116, 118 may be susceptible to small particle contamination that could interfere with valve performance. For example, in some cases small particles may accumulate on the moving component or flap of the valve making it difficult for the valve to transition between open and closed states, or require larger direct current (DC) bias voltages than the system can provide to transition the component or flap between states. Valves 114, 116, 118 may therefore further include a particle removal system, component or mechanism 122 to reduce or remove particles which may interfere with an operation of a valve. Representatively, the particle removal mechanism 122 may include an actuator such as an alternating current (AC) circuit component that is added to the existing DC bias voltage required for primary operation of the valve. At specified intervals, an AC voltage may be applied to the valve 114, 116, 118 to transition the moving component of the valve between a number of mechanical modes (or configurations) that remove the adhering particles. For example, the AC voltage may vibrate areas or regions of the valve moving component or flap where the particles are prone to collect to remove the adhering particles. In some aspects, the particles may be solid particles that adhere to the valve 114, 116, 118 and are removed by the particle removal mechanism 122 as will be described in more detail in reference to FIGS. 2-6. In other aspects, the particles may be liquid particles that collect on or near the valve 114, 116, 118, and the particle removal mechanism 122 may be operable to drive the liquid particles away from the valve 114, 116, 118 as will be described in more detail in reference to FIGS. 7-10.

Figure 2:
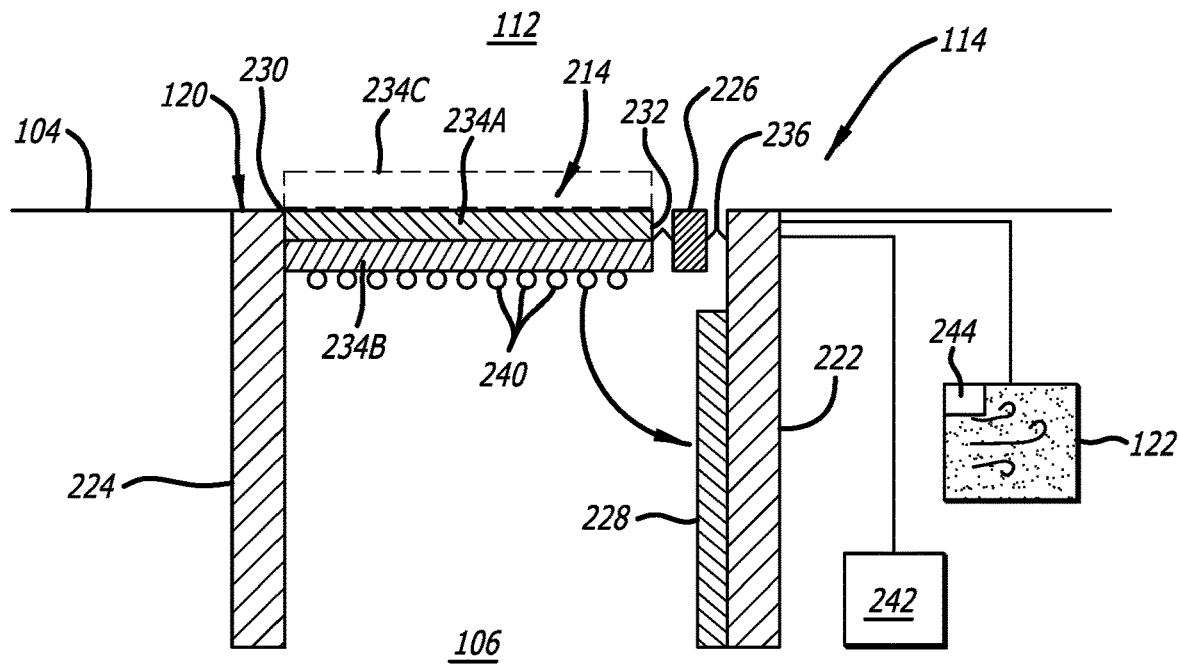
FIG. 2 illustrates a cross-sectional side view of one aspect of a particle removal mechanism and a valve of the portable electronic device and/or transducer assembly of FIG. 1 in a closed configuration.

A number of representative configurations for valves 114, 116, 118 having a particle cleaning or removal mechanism 122 will now be described in reference to FIGS. 2-10. Representatively, FIG. 2 illustrates a cross-sectional side view of a representative valve from FIG. 1. In this aspect, FIG. 2 shows valve 114 used to open/close opening 120 formed in enclosure wall 104. It should be understood, however, that although valve 114 is specifically discussed, one or more of valves 116 and/or 118 may be the same as valve 114 such that the description provided herein also applies to any other valves disclosed in FIG. 1. From this view, it can be seen that valve 114 may include a moving component or flap 214 configured to open/close opening 120. It should be recognized that although the term "flap" is used herein, flap 214 may be any structure suitable for opening and/or closing opening 120 as discussed herein. In some aspects, opening 120 may be a relatively small vent or leak port through the enclosure wall 104, for example, from about 1 mm to about 3 mm. The opening and/or closing of flap 214 may be driven by the application of a voltage to give a variable impedance control. For example, in some aspects, the application of a direct current (DC) electric voltage may be used to open flap 214. In still further aspects, once opened, flap 214 may be considered "latched", and can remain latched in the open position while almost reducing the power to virtually zero. In this aspect, valve 114 may consume a relatively low amount of power when transitioning between open/closed states or configurations.

Figure 3:
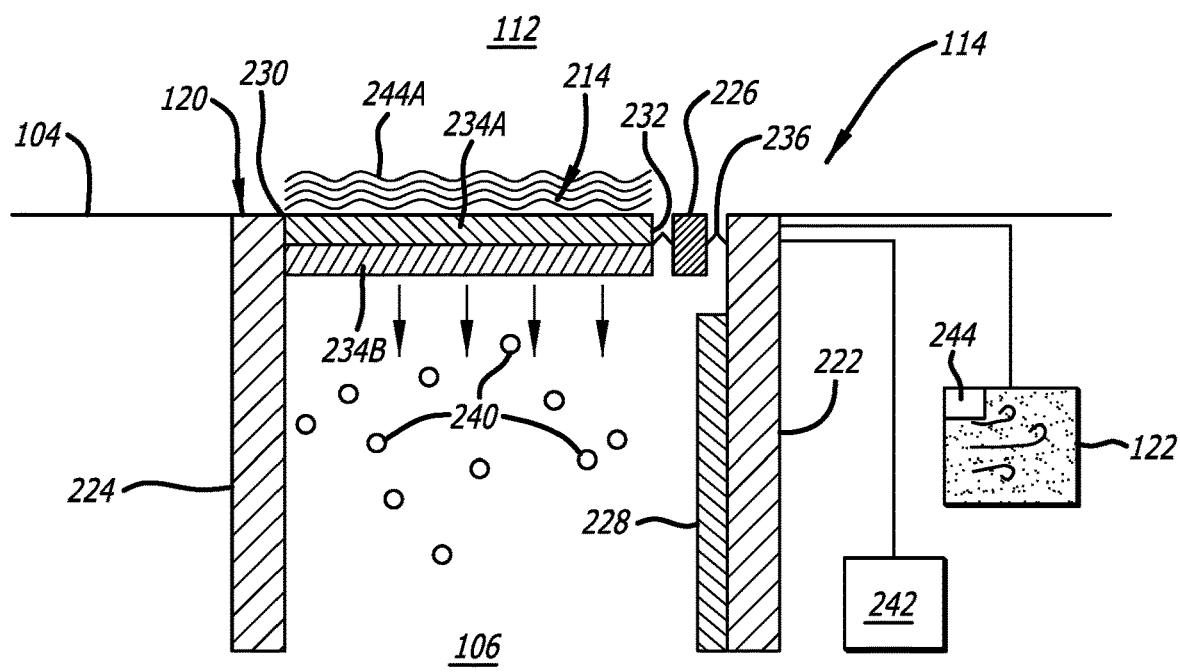
FIG. 3 illustrates a cross-sectional side view of one aspect of a particle removal mechanism and a valve of a portable electronic device and/or transducer assembly of FIG. 1 in a closed configuration.
Figure 4:
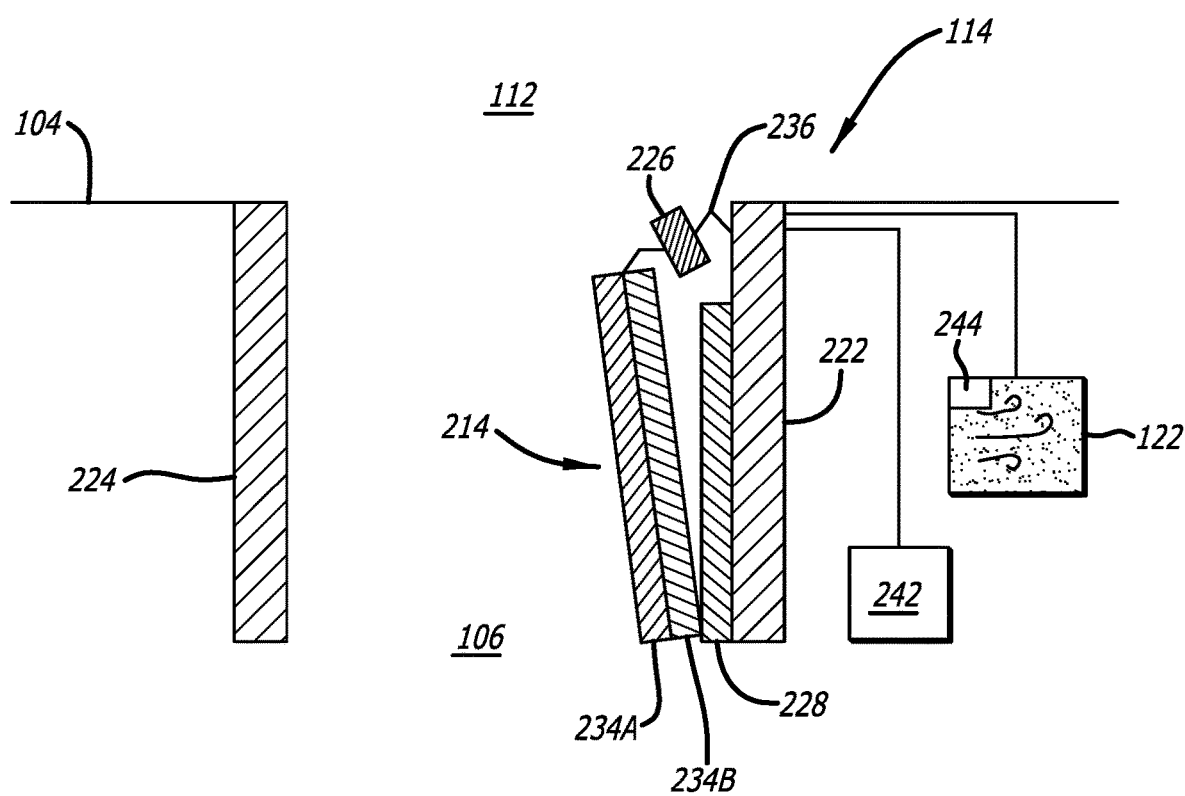
FIG. 4 illustrates a cross-sectional side view of one aspect of a particle removal mechanism and a valve of a portable electronic device and/or transducer assembly of FIG. 1 in an open configuration.
Figure 5:
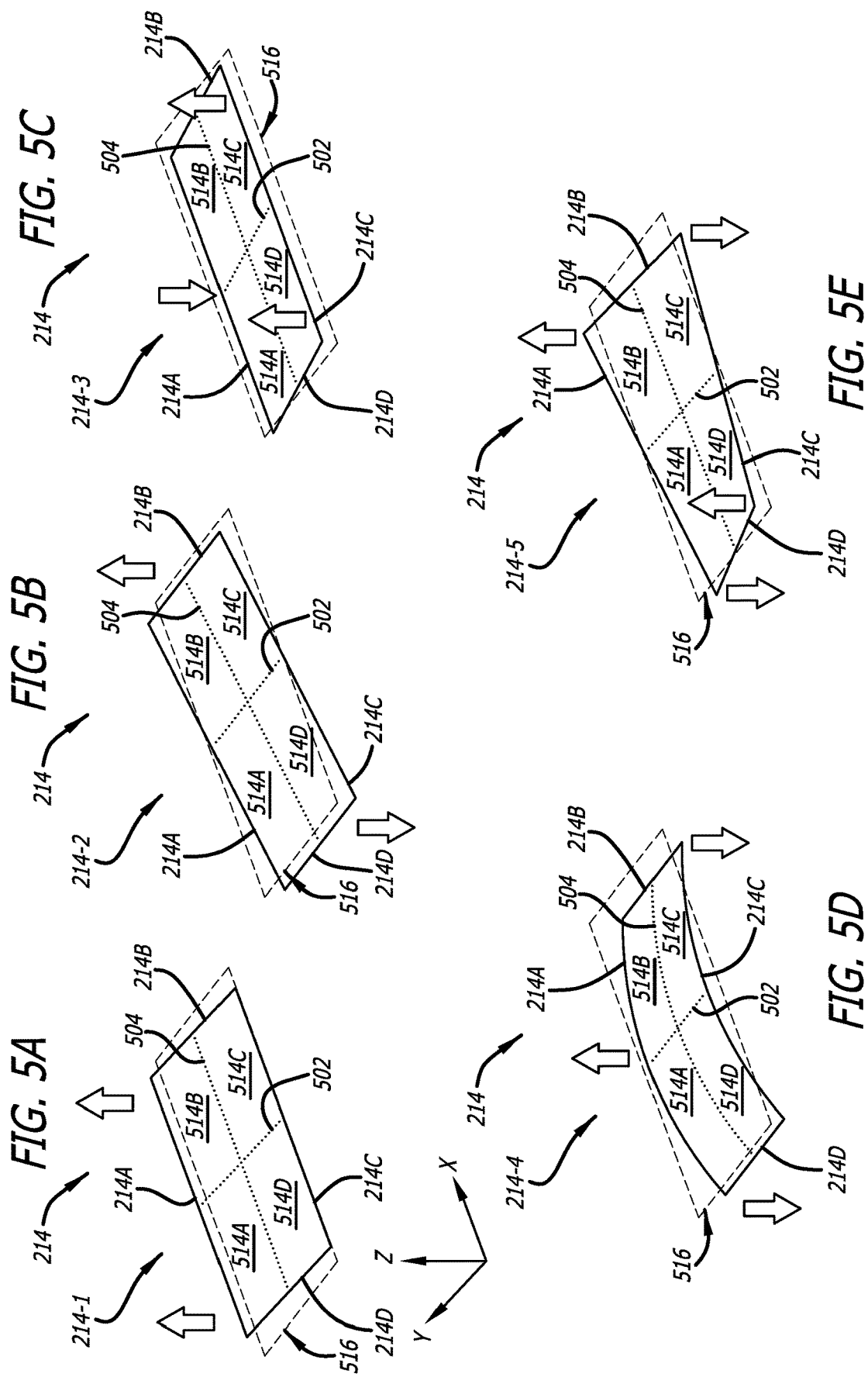
FIG. 5A illustrates a top perspective view of one aspect of a movable component of the valve of FIGS. 1-4 in a first mechanical mode.
FIG. 5B illustrates a top perspective view of one aspect of a movable component of the valve of FIGS. 1-4 in a second mechanical mode.
FIG. 5C illustrates a top perspective view of one aspect of a movable component of the valve of FIGS. 1-4 in a third mechanical mode.
FIG. 5D illustrates a top perspective view of one aspect of a movable component of the valve of FIGS. 1-4 in a fourth mechanical mode.
FIG. 5E illustrates a top perspective view of one aspect of a movable component of the valve of FIGS. 1-4 in a fifth mechanical mode.
Figure 6:
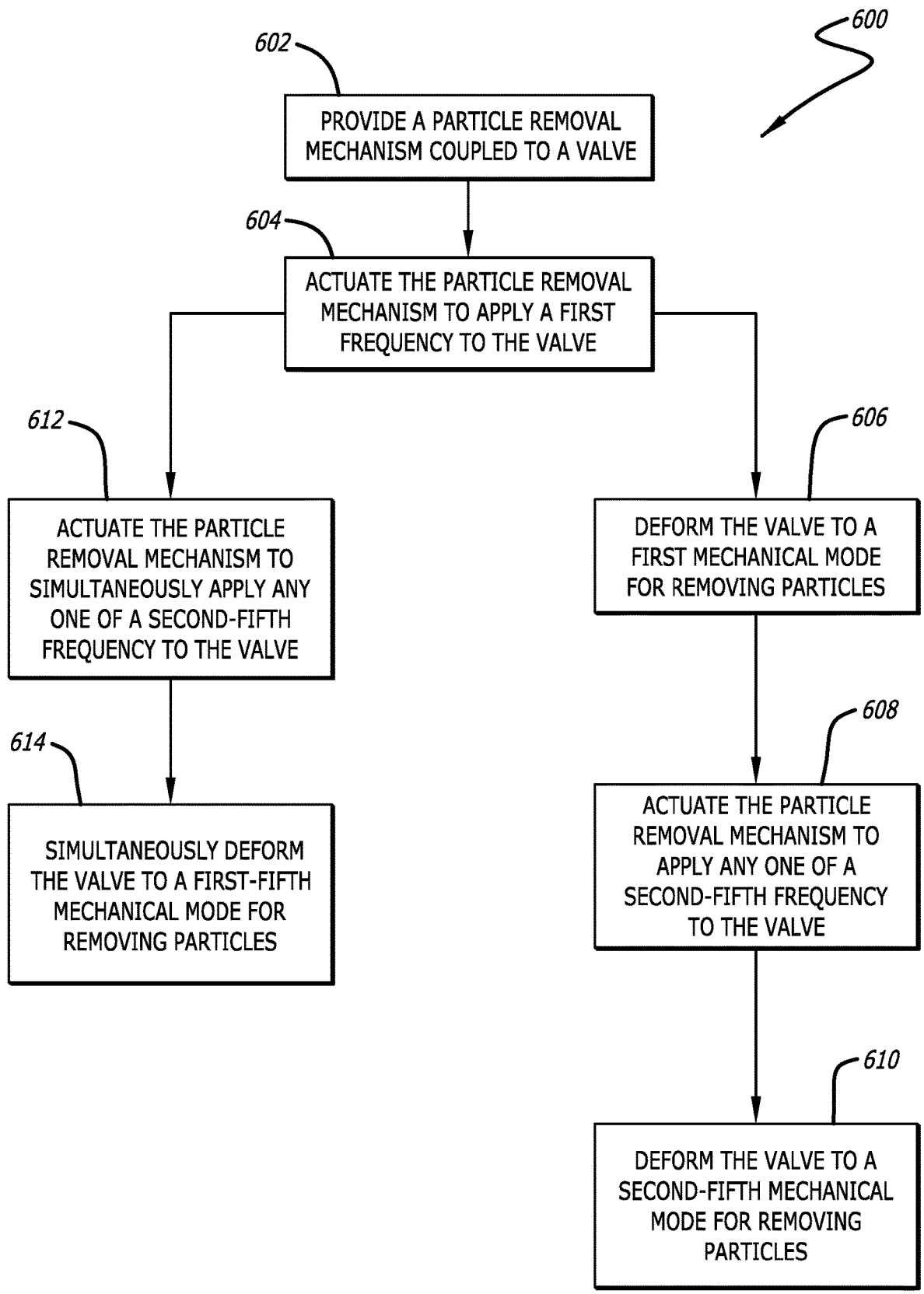
FIG. 6 illustrates a block diagram of a representative process for reducing or removing particles from a valve using the particle removal mechanism of FIGS. 1-4.

Representatively, flap 214 may include a first end 230 that is considered a free end that is free to move relative to a support member 224 to open/close the opening 120, and a second end 232 coupled to support member 222 by a hinge 226. Second end 232 drives the movement of the free or first end 230 between open and closed positions. Free or first end 230 is considered to be in a closed position in which it closes opening 120 when it contacts support member 224. Free or first end 230 may be in an open position in which it opens opening 120 when it is not contacting support member 224, or there is otherwise a gap between end 230 and support member 224. In some aspects, hinge 226 may include a spring or biasing mechanism 236 that biases flap 214 toward the closed or horizontal position in which flap 214 covers opening 120 as shown in FIG. 2. In this aspect, in the resting state shown in FIG. 2 (e.g., no voltage is applied), flap 214 will remain closed or otherwise in a position such that it is covering opening 120. The application of a sufficient voltage to flap 214, however, will create an attractive force between flap 214 and support member 222 that overcomes the biasing force of the hinge 226. This, in turn, causes flap 214 to move or rotate (as shown by the arrow) toward support member 222 to the open position (or vertical position) in which it is not covering opening 120 and latch to support member 222 due to the electrostatic forces, as shown in FIG. 3. As can further be seen from FIG. 2, when flap 214 is closed, the enclosure interior chamber 106 is closed, or sealed off, from ambient environment 112. On the other hand, when flap 214 is in the open position, as shown in FIG. 4, interior chamber 106 is open, or shares a volume, with ambient environment 112.

In one aspect, flap 214 and/or support member 222 may include materials that allow for the opening and/or closing of flap 214 relative to opening 120 upon application of a voltage and electrostatic forces. Representatively, flap 214 may include a first material layer 234A that is made of a metal material and a second material layer 234B that is made of a structural material. In some aspects, flap 214 may further include an optional deforming material layer 234C connected to second material layer 234B and first material layer 234A. Deforming material layer 234C may deform, and in turn, drive the deformation of the flap 214, to the different mechanical modes for particle removal upon application of a voltage, as previously discussed. In other aspects, deforming material layer 234C may be omitted and instead the material of one or more of material layers 234A, 234B may deform flap 214 to the different mechanical modes upon application of the voltage. For example, material layer 234A may be made of a metal material or another material with an embedded material that deforms the layer application of a voltage to the different mechanical modes. In some aspects, one or more of materials for layers 234A-234C may be made of any MEMS material. For example, first material layer 234A may be made of a metal material including, but not limited to, gold, aluminum or the like. In some aspects, first material layer 234A may be referred to herein as an electrode layer, or as including an electrode. Second material layer 234B may be made of a structural material including, but not limited to, polysilicon, silicon nitride, silicon carbide, single crystalline silicon, or polymer MEMS materials in general. Third material layer 234C may be made of a metal material similar to the first material layer 234A. The first material layer 234A, second material layer 234B and optional third material layer 234C may be fixedly attached to one another (e.g., during a processing operation, using an adhesive, etc.) to form flap 214. Support member 222 may include a material that allows flap 214 to rotate toward support member 222 and latch to support member 222 upon application of a force. Representatively, support member 222 may be a perpendicularly extending part (or wall) of a substrate or enclosure wall and include an insulating material 228 attached to a side or surface facing flap 214. In some aspects, support member 222 may be made of a single crystal silicon, a quartz or a glass material, and the insulating material 228 may be, for example, an aluminum oxide or silicon dioxide material layer. Upon application of a DC voltage to flap 214, the voltage will slowly start applying force on the flap 214. The voltage may be continually increased until an attractive force is generated that causes flap 214 to move or rotate toward support member 222 and latch thereto. It should further be understood that once latched, flap 214 can stay latched while almost reducing the power to zero due to electrostatic forces. Once, however, the voltage is decreased to a certain threshold value, the spring/mechanical force of hinge 226 will overcome the electrostatic force causing flap 214 to rotate back to the closed position shown in FIG. 2. In some aspects, the device may have an application-specific integrated circuit (ASIC) 242 that could be next to flap 214 that connects with and is used to apply the voltage necessary (e.g., a DC voltage) to dynamically control flap 214.

As further illustrated in FIG. 2, in some aspects, particles 240 may attach to flap 214 inhibiting the operation of flap 214. For example, particles 240 may be solid particles that enter opening 120 from the ambient environment 112 or may come from within interior chamber 106. Particles 240 may attach (e.g., adhere or stick) to the interior side of flap 214 as shown. For example, particles 240 may attach to an interior side of the material layer 234B of flap 214. In this aspect, if flap moves to the open position as shown in FIG. 4 with the particles 240 attached, the particles 240 become sandwiched between flap 214 and support structure 222. This, in turn, can interfere with "latching" of flap 214 to structure 222. To remove these particles 240, valve 114 may further include particle removal system, component or mechanism 122. Particle removal system, component or mechanism 122 may be, or otherwise include an actuator that is operable to actuate or cause flap 214 to deform to one or more of a number of mechanical modes that dislodge or otherwise remove particles 240 from flap 214. Representatively, the actuator may include an alternating current (AC) circuit 244 that can generate and/or apply one or more of a number of AC frequencies 244A that cause flap 214 to deform to one or more desired mechanical modes. In some aspects, the frequencies 244A may be within an ultrasonic frequency range that is inaudible to the user. For example, AC circuit 244 may generate or apply AC frequencies 244A within a range of 20 kHz or more to actuate the different mechanical modes. Representatively, each mechanical mode may be actuated by a different frequency range. To actuate the different mechanical modes, AC circuit 244 may apply frequencies 244A within the ranges found to actuate the desired mode. AC circuit 244 may apply multiple frequencies (or tones) simultaneously to actuate multiple modes simultaneously or sequentially to actuate multiple modes sequentially as will be discussed in more detail in reference to FIGS. 5A-5E. Upon application of the one or more frequencies (or tones) 244A by the AC circuit 244, flap 214 will deform and/or vibrate in certain areas more than others and cause particles 240 attached to flap 214 to become detached and fall off flap 214 as shown in FIG. 3. With the particles 240 now removed from flap 214, flap 214 is free to move to the open configuration and can latch to support member 222 without interference from particles 240 as shown in FIG. 4.

Representative different mechanical modes that can be achieved depending on the AC frequency applied will now be described in reference to FIGS. 5A-5E. As can be seen from FIGS. 5A-5E, flap 214 may deform to different shapes, configurations, or modes depending on the frequency that is applied by the AC circuit actuator previously discussed in reference to FIGS. 2-4. Representatively, depending on the frequency applied, flap 214 may have more acceleration or vibration in certain parts than in others causing it to deform into a number of different configurations. This, in turn, allows for the different mechanical modes to be used to remove particles at different regions of the valve. For example, AC circuit 244 may apply frequencies within a first range from about 20 kHz to about 30 kHz to actuate a first mechanical mode, a second range from about 30 kHz to about 40 kHz to actuate a second mechanical mode, a third range from about 40 kHz to about 100 kHz to actuate a third mechanical mode, a fourth range from about 100 kHz to about 150 kHz to actuate a fourth mechanical mode, or a fifth range from about 150 kHz to about 200 kHz to actuate a fifth mechanical mode. AC circuit 244 may generate or apply frequencies (or tones) within a single frequency range that would actuate one of the mechanical modes, multiple frequencies (or tones) across multiple frequency ranges to simultaneously actuate multiple mechanical modes at once, or a sequence or sweep of frequencies (or tones) across multiple frequency ranges to actuate the mechanical modes in sequence.

Referring now to FIG. 5A, FIG. 5A illustrates flap 214 deformed to a first mechanical mode 214-1. Deformation of flap 214 to first mechanical mode 214-1 may be caused by application of an AC voltage or current at a first frequency and/or one or more frequencies within a first frequency range by the particle removal mechanism 122. The first frequency or first frequency range may be, for example, within a range of from about 20 kHz to about 30 kHz. For example, in a resting or non-actuated state, flap 214 may be a flat or planar structure having sides 214A, 214B, 214C, 214D within the X-Y plane represented by outline 516. Application of an AC voltage at the first frequency or within the first frequency range actuates flap 214 causing side 214A to vibrate and/or deform out-of-plane to first mechanical mode 214-1. Representatively, side 214A may vibrate and/or deform out-of-plane in a direction as illustrated by the arrow. The opposite side 214C of flap 214 may not be actuated, or only minimally actuated, at this frequency such that it does not deform or otherwise remains substantially within plane 516. In this aspect, flap 214 may be more actuated or deform at certain sides, areas or regions than others to remove particles collecting at those sides, areas or regions. For example, flap 214 may be thought of as having different surface areas or regions 514A, 514B, 514C and 514D defined by the intersection of the axis 502 along the midline (e.g., Y-axis) and the axis 504 intersecting the axis 502 (e.g., X-axis) as shown in FIG. 5A. Application of the AC voltage within the first frequency range may vibrate one or more of these surface areas or regions 514A-514D deforming them out of plane to remove particles adhering to those areas or regions. For example, in first mechanical mode 214-1 shown in FIG. 5A, regions 514A, 514B between side 214A and axis 504 vibrate and deform, while regions 514C, 514D are not actuated and remain in a substantially resting configuration. First mechanical mode 214-1 may therefore be optimal for removing particle accumulation within regions 514A-514B of flap 214.

FIG. 5B illustrates flap 214 in a second mechanical mode 214-2. Deformation of flap 214 to second mechanical mode 214-2 may be caused by application of an AC voltage or current at a second frequency and/or one or more frequencies within a second frequency range by the particle removal mechanism 122. The second frequency or second frequency range may be, for example, within a range of from about 30 kHz to about 40 kHz. For example, in a resting or non-actuated state, flap 214 may be a flat or planar structure having sides 214A, 214B, 214C, 214D within the X-Y plane represented by outline 516 as previously discussed. Application of an AC voltage at the second frequency or within the second frequency range actuates flap 214 causing sides 214B and 214D to vibrate and deform out-of-plane to second mechanical mode 214-2. Representatively, sides 214B and 214D may vibrate or deform out-of-plane in opposite direction as illustrated by the arrows. The center or middle of flap 214 may not be actuated, or only minimally actuated, at this frequency such that it does not deform or otherwise remains substantially within plane 516. For example, in second mechanical mode 214-2 shown in FIG. 5B, portions of regions 514B, 514C closest to side 214B and portions of regions 514A, 514D closest to side 214D vibrate and deform, while the portions of regions 514A-D closest to the center or midline of flap 214 are not actuated and remain in a substantially resting configuration. Second mechanical mode 214-2 may therefore be optimal for removing particle accumulation on portions of regions 514A-D near sides 214B, 214D.

FIG. 5C illustrates flap 214 in a third mechanical mode 214-3. Deformation of flap 214 to third mechanical mode 214-3 may be caused by application of an AC voltage or current at a third frequency and/or one or more frequencies within a third frequency range by the particle removal mechanism 122. The third frequency or third frequency range may be, for example, within a range of from about 40 kHz to about 100 kHz. For example, in a resting or non-actuated state, flap 214 may be a flat or planar structure having sides 214A, 214B, 214C, 214D within the X-Y plane represented by outline 516 as previously discussed. Application of an AC voltage at the third frequency or within the third frequency range actuates flap 214 causing the entire side 214C and portions of sides 214A, 214B and 214D to vibrate and deform out-of-plane to third mechanical mode 214-3. Representatively, side 214C and portions of sides 214A, 214B and 214D may vibrate or deform out-of-plane in the directions illustrated by the arrows. An arcuate region along the center or middle of flap 214 may not be actuated, or only minimally actuated, at this frequency such that it does not deform or otherwise remains substantially within plane 516. For example, in third mechanical mode 214-3 shown in FIG. 5C, most of regions 514C, 514D closest to side 214C and portions of regions 514A, 514B closest to a center or midline of side 214A vibrate and deform, while the remaining portions of regions 514A-D are not actuated and remain in a substantially resting configuration. Third mechanical mode 214-3 may therefore be optimal for removing particle accumulation on portions of regions 514A-D near sides 214A and/or 214C.

FIG. 5D illustrates flap 214 in a fourth mechanical mode 214-4. Deformation of flap 214 to fourth mechanical mode 214-4 may be caused by application of an AC voltage or current at a fourth frequency and/or one or more frequencies within a fourth frequency range by the particle removal mechanism 122. The fourth frequency or fourth frequency range may be, for example, within a range of from about 100 kHz to about 150 kHz. For example, in a resting or non-actuated state, flap 214 may be a flat or planar structure having sides 214A, 214B, 214C, 214D within the X-Y plane represented by outline 516 as previously discussed. Application of an AC voltage or current at the fourth frequency or within the fourth frequency range actuates flap 214 causing the entire sides 214B, 214D and portions of sides 214A, 214C to vibrate and deform out-of-plane to fourth mechanical mode 214-4. Representatively, sides 214B, 214D and portions of sides 214A, 214C may vibrate or deform out-of-plane in opposite directions as illustrated by the arrows. Regions between the midline 502 and sides 214B, 214D of flap 214 may not be actuated, or only minimally actuated, at this frequency such that they do not deform or otherwise remain substantially within plane 516. For example, in fourth mechanical mode 214-4 shown in FIG. 5D, portions of regions 514A-D closest to the midline 502 and sides 214B and 214D vibrate and deform, while the remaining portions of regions 514A-D are not actuated and remain in a substantially resting configuration. Fourth mechanical mode 214-4 may therefore be optimal for removing particle accumulation on portions of regions 514A-D near sides 214B, 214D or near the midline or axis 502 of flap 214 as shown.

FIG. 5E illustrates flap 214 in a fifth mechanical mode 214-5. Deformation of flap 214 to fifth mechanical mode 214-5 may be caused by application of an AC voltage or current at a fifth frequency and/or one or more frequencies within a fifth frequency range by the particle removal mechanism 122. The fifth frequency or fifth frequency range may be, for example, within a range of from about 150 kHz to about 200 kHz. For example, in a resting or non-actuated state, flap 214 may be a flat or planar structure having sides 214A, 214B, 214C, 214D within the X-Y plane represented by outline 516 as previously discussed. Application of an AC voltage or current at the fifth frequency or within the fifth frequency range actuates flap 214 causing the corners defined by sides 214A-D to vibrate and deform out-of-plane to fifth mechanical mode 214-5. Representatively, each of the corners formed by adjacent sides 214A-D may vibrate or deform out-of-plane in different directions as illustrated by the arrows. The center of flap 214 may not be actuated, or only minimally actuated, at this frequency such that it does not deform or otherwise remain substantially within plane 516. For example, in fifth mechanical mode 214-5 shown in FIG. 5E, portions of regions 514A-D closest to the corners defined by sides 214A-D vibrate and deform, while the remaining portions of regions 514A-D are not actuated and remain in a substantially resting configuration. Fifth mechanical mode 214-5 may therefore be optimal for removing particle accumulation on portions of regions 514A-D near the corners of flap 214 as shown.

As previously discussed, particle removal mechanism 122 may have an AC circuit 244 that can apply the multiple frequencies (or tones) as previously discussed simultaneously to simultaneously actuate multiple mechanical modes 214-1 to 214-5, or sequentially to sequentially actuate mechanical modes 214-1 to 214-5 as desired. For example, as described in reference to FIG. 6, in one aspect, a representative particle removal process 600 may include providing a particle removal mechanism coupled to a valve at operation 602. The particle removal mechanism may be particle removal mechanism 122 and the valve may be valve 114 previously discussed in reference to FIGS. 1-5E. At operation 604, the particle removal mechanism may be actuated to apply a first frequency to the valve. The particle removal mechanism may be actuated by the AC circuit 244 and apply a first frequency within an ultrasonic frequency range as previously discussed. For example, the first frequency may be a frequency within a range of 20 kHz or more, or for example, a range of 20 kHz to 30 kHz. Application of the first frequency, in turn, deforms the valve to a first mechanical mode for removing particles at operation 606. Representatively, the first mechanical mode could be any one of the mechanical modes 214-1 to 214-5 discussed in reference to FIGS. 5A-5B. For example, where the first frequency applied at operation 604 is a frequency within a range of from 20 kHz to 30 kHz, the valve may be deformed to a first mechanical mode 214-1 described in reference to FIG. 5A. In other aspects, where the first frequency is within a range of from 30 kHz or more, the valve may be deformed to one of the mechanical modes 214-2 to 214-5 described in reference to FIG. 5B-5E. In some aspects, process 600 then continues to operation 608 in which the particle removal mechanism applies any one of a second, third, fourth or fifth frequency to the valve. The second, third, fourth and/or fifth frequency may be within a range different than the first frequency already applied. For example, where the first frequency was within a range of from 20 kHz to 30 kHz, the second to fifth frequency applied may be within a range of 30 kHz or more, or from about 30 kHz to about 200 kHz. Upon application of the second to fifth frequency, the valve may deform to a second, third, fourth or fifth mechanical mode for removing particles at operation 610. For example, the valve may deform to any one of the mechanical modes 214-1 to 214-5 previously discussed in reference to FIGS. 5A-5E. It should further be understood that in operations 604-610, the different frequencies are applied sequentially (e.g., one after the other) and therefore the transition between mechanical modes 214-1 to 214-5 may also be sequential. In other words, the valve is caused to deform to one of mechanical modes 214-1 to 214-5 at a time. For example, in operations 604-610 the particle removal mechanism may be understood as performing a sequential ultrasonic cleaning process in which it goes through a sweep of a range of ultrasonic frequencies (e.g., 20 kHz to 200 kHz) that are generated to remove any particle via sequentially actuating multiple mechanical modes (e.g., modes 214-1 to 214-5) of the valve.

Process 600 may, however, further include an alternative processing sequence of operations illustrated by operations 612-614 in which multiple frequencies and multiple mechanical modes may be actuated simultaneously. Representatively, at the same time that operation 604 is performed, operation 612 may be performed to actuate the particle removal mechanism to simultaneously apply any one or more of a second, third, fourth and/or fifth frequency to the valve. This, in turn, deforms the valve to a first, second, third, fourth and/or fifth mechanical mode such that the valve deforms to multiple mechanical modes at the same time or simultaneously in operation 614. This sequence of operations 604, 612, 614 may be considered a multimodal cleaning process in which the valve is deformed to multiple mechanical modes (e.g., modes 214-1 to 214-5) simultaneously to remove particles on various surfaces of the valve. In addition, it should be understood that although first, second, third, fourth and fifth frequencies and/or mechanical modes are described in process 600, any number of frequencies, frequency ranges and/or mechanical modes could be applied and/or achieved in process 600. In other words, although first through fifth frequencies and/or mechanical modes are described, "n" number of frequencies and/or mechanical modes could be applied and/or achieved sequentially or simultaneously according to the operations of process 600.

Referring now to FIGS. 7-10, FIGS. 7-10 refer to another particle removal mechanism that may be implemented separately or in combination with any one or more of the previously discussed valve and particle removal configurations. Representatively, similar to the device configurations previously discussed in FIGS. 1-6, device 700 may include an enclosure wall 104 that separates an interior volume or chamber 106 from the ambient environment 112. Valve 114 may be coupled to a vent or leak 720 that vents the interior volume or chamber 106 to the ambient environment 112. An application-specific integrated circuit (ASIC) 242 may further be coupled to valve 114 to apply the voltage necessary (e.g., a DC voltage) to dynamically control valve 114. In addition, particle removal mechanism 122 may be coupled to valve 114 for removal of particles from valve 114 as previously discussed in reference to FIGS. 1-6. Representatively, as previously discussed, particle removal mechanism 122 may be used to remove solid particles from the valve flap.

In some aspects, the system or device may also, or alternatively, include a particle removal system, assembly or mechanism 702 that is operable to remove liquid particles near valve 114 and/or within device 100. Representatively, particle removal mechanism 702 may be used to remove liquid particles 713 that may collect on, near or within a pathway between valve 114 and the ambient environment 112, or another volume or chamber. In some aspects, the pathway between the valve 114 and the ambient environment 112 may be an ultrasonic nozzle 704 that includes an actuator 706 that is operable to push the liquid particles 713 out of the pathway. Representatively, the nozzle 704 may be formed by one or more Fourier horns that create a standing wave within the pathway between valve 114 and ambient environment 112. In some aspects, the nozzle 704 diameter may be tuned to maintain a desired acoustic impedance. For example, the diameter of nozzle 704 may be optimized or tuned to not eliminate selected acoustic impedance specifications for the system. Actuator 706 may generate or apply an ultrasonic or high frequency wave that, in turn, can push the liquid particles 713 out of the pathway to the ambient environment 112. Representatively, actuator 706 may be coupled to an AC circuit 708 that may be used to drive the actuator 706 to apply the high frequency voltage. For example, actuator 706 may be coupled to nozzle 704 and may cause a vibration of the wall of the nozzle 704 at very high frequencies that causes the liquid particles to be pushed out to ambient environment 112.

Figure 7:
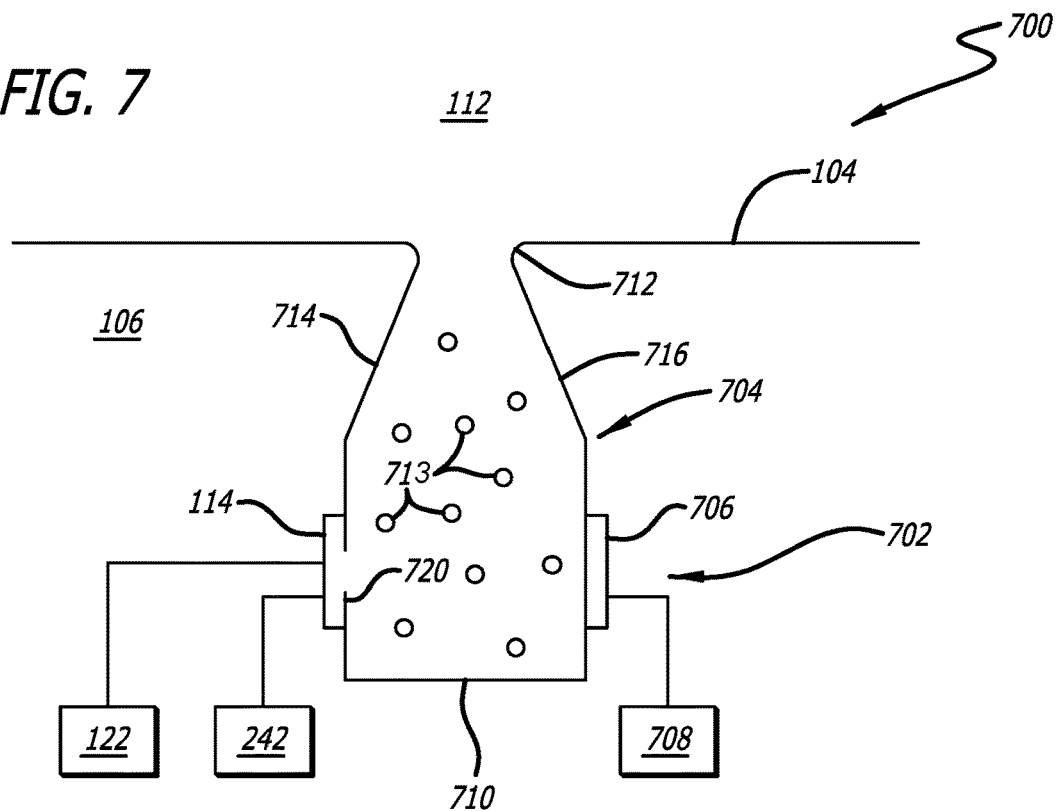
FIG. 7 illustrates a cross-sectional side view of another aspect of a valve and a particle removal mechanism of the portable electronic device and/or transducer assembly of FIG. 1.

Referring now in more detail to the nozzle 704 and particle removal mechanism 702 shown in FIG. 7, it can be seen that in this configuration, nozzle 704 includes a closed base end 710, an open end 712 that opens to the ambient environment 112 (or another system volume), and side walls 714, 716 defining the pathway between ends 710 and 712. In some aspects, the end 710 and side walls 714, 716 may define a multiple-Fourier horn nozzle or structure that defines the pathway to ambient environment 112 as previously discussed. In some aspects, valve 114 may be coupled to side wall 714. Valve 114 may be used to control opening/closing of a vent or leak port 720 in the side wall 714. Port 720 may couple the interior volume or chamber 106 to the ambient environment 112 when valve 114 is in the open position, or the port 720 is otherwise considered open. Valve 114 may be positioned near the closed end 710 as shown. Actuator 706 may be coupled to the side wall 716 opposite the valve 114.

Figure 8:
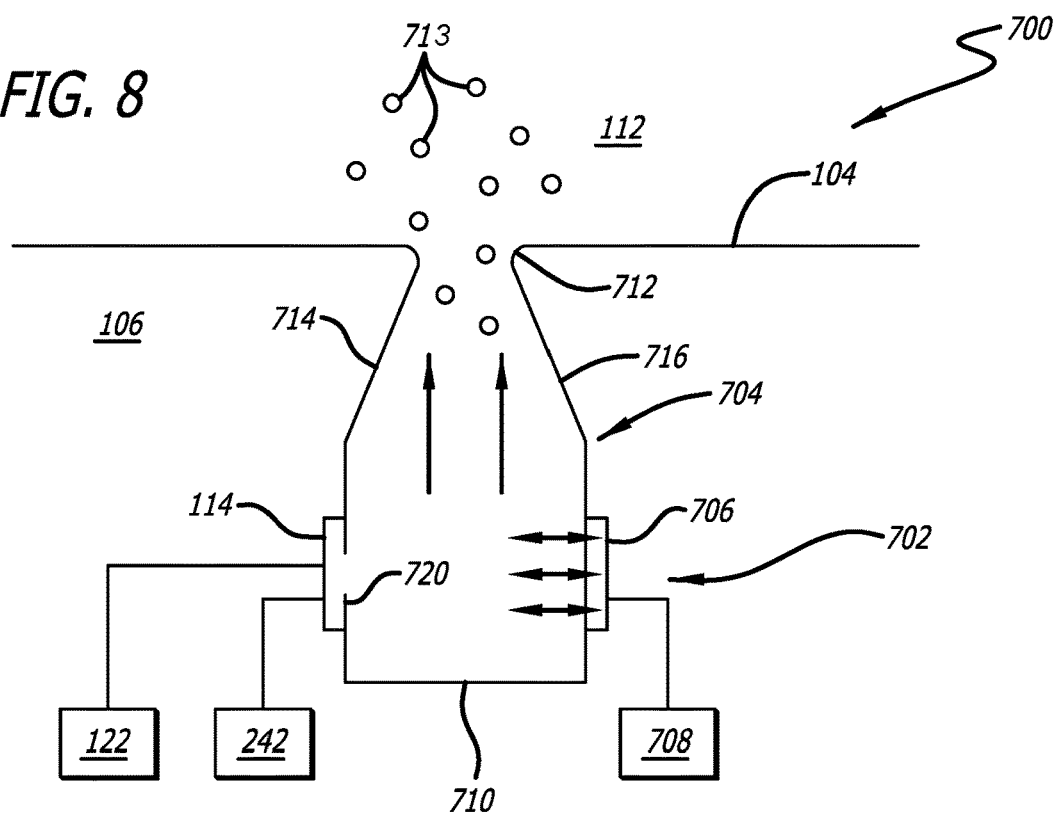
FIG. 8 illustrates a cross-sectional side view of another aspect of a valve and a particle removal mechanism of the portable electronic device and/or transducer assembly of FIG. 1.

Actuator 706 may be positioned near closed end 710 as well. In some aspects, actuator 706 may be a piezoelectric (PZT) film, layer or other structure applied or otherwise attached to side wall 716 that can be actuated upon application of a voltage. During operation of the particle removal mechanism 702, AC circuit 708 drives actuator 706 to apply a high frequency voltage as previously discussed. This high frequency voltage may vibrate side wall 716 and create a high frequency wave within nozzle 704. This high frequency wave may, in turn, push liquid particles 713 out the open end 712 to the ambient environment 112 as shown in FIG. 8. Representatively, in some aspects, the actuator 706 may increase a pressure within the pathway formed by nozzle 704 which, in turn, displaces or otherwise causes the side wall 716 to vibrate. As previously discussed, valve 114 is closed during operation of actuator 706 therefore the only direction liquid particles 713 can be driven is out open end 712 to ambient environment 112. In this aspect, it is desirable for valve 114 to be in a closed configuration (e.g., port 720 is closed) during operation of particle removal mechanism 702. When particle removal mechanism 702 is not being used, valve 114 may be in an open configuration (e.g., port 720 is open) such that the interior volume or chamber 106 is open to the ambient environment 112.

Figure 9:
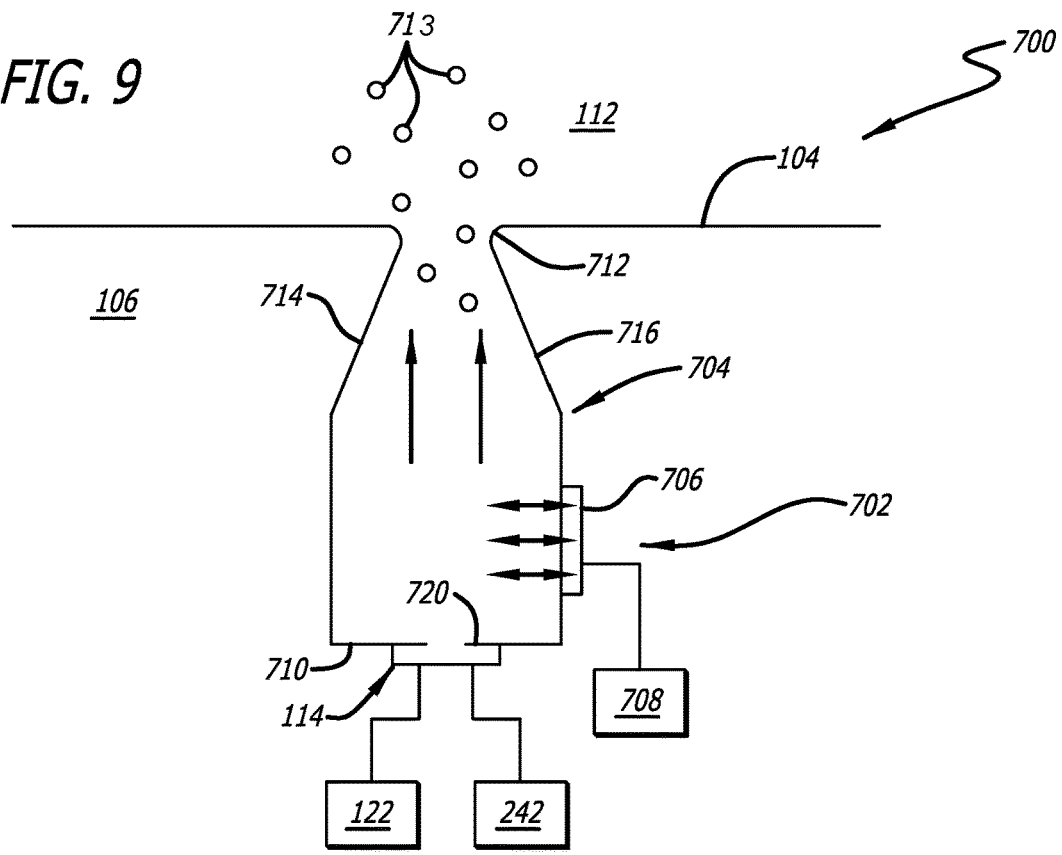
FIG. 9 illustrates a cross-sectional side view of another aspect of a valve and a particle removal mechanism of the portable electronic device and/or transducer assembly of FIG. 1.

Referring now to FIG. 9, FIG. 9 illustrates another representative nozzle and particle removal mechanism. Representatively, nozzle 704 and particle removal mechanism 702 shown in FIG. 9 may be the same as that described in reference to FIGS. 7-8. In this configuration, however, valve 114 is used to open/close a port 720 in the closed base end 710 of nozzle 704. Actuator 706 of particle removal mechanism 702 remains coupled to side wall 716 of nozzle 704. In this aspect, valve 114 and actuator 706 are on adjoining ends and/or walls 710, 716 of nozzle 704. Similar to the previously discussed configuration, during operation of the particle removal mechanism 702, AC circuit 708 drives actuator 706 to apply a high frequency voltage as previously discussed. This high frequency voltage may vibrate closed base end 710 and create a high frequency wave within nozzle 704. This high frequency wave may, in turn, push liquid particles 713 out the open end 712 to the ambient environment 112 as shown in FIG. 9. As previously discussed, valve 114 is closed during operation of actuator 706 therefore the only direction liquid particles 713 can be driven is out open end 712 to ambient environment 112. In this aspect, it is desirable for valve 114 to be in a closed configuration (e.g., port 720 is closed) during operation of particle removal mechanism 702. When particle removal mechanism 702 is not being used, valve 114 may be in an open configuration (e.g., port 720 is open) such that the interior volume or chamber 106 is open to the ambient environment 112.

Figure 10:
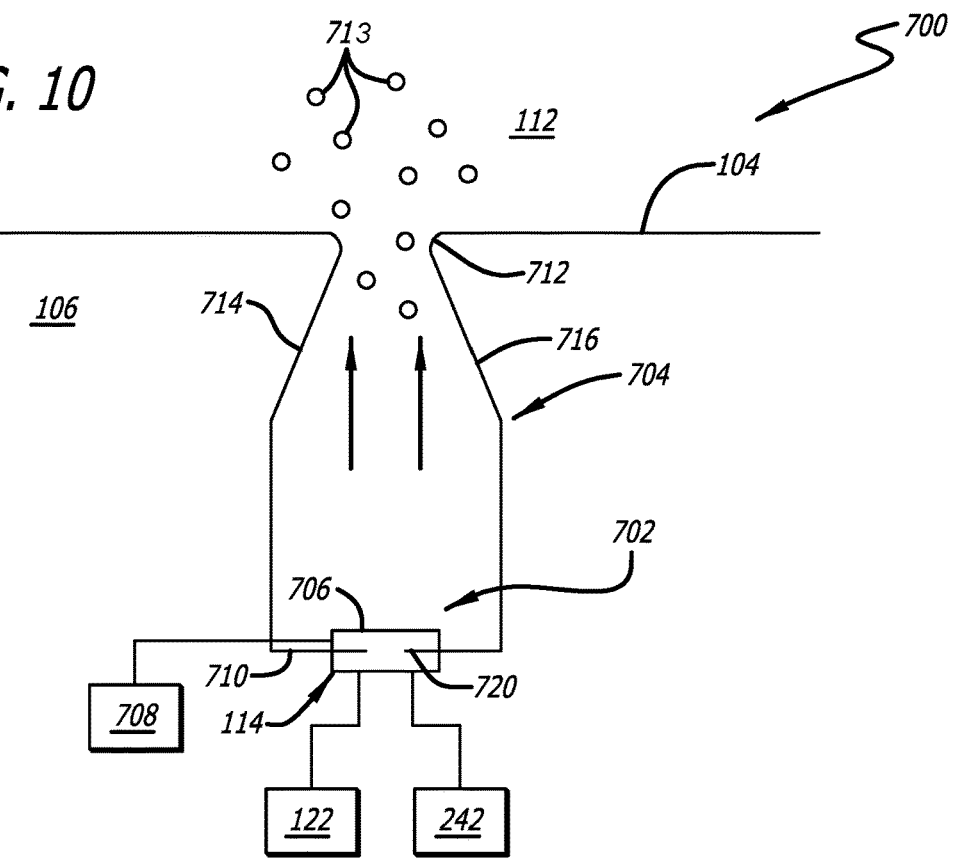
FIG. 10 illustrates a cross-sectional side view of another aspect of a valve and a particle removal mechanism of the portable electronic device and/or transducer assembly of FIG. 1.

Referring now to FIG. 10, FIG. 10 illustrates another configuration of a representative nozzle and particle removal mechanism. Representatively, nozzle 704 and particle removal mechanism 702 shown in FIG. 10 may be the same as that described in reference to FIGS. 7-9. In this configuration, however, actuator 706 of particle removal mechanism 702 is coupled to valve 114 used to open/close a port 720 in the closed base end 710 of nozzle 704. In this aspect, valve 114 and actuator 706 are combined into a dual function structure or mechanism coupled to base end 710 of nozzle 704. Representatively, actuator 706 could be a PZT film or layer applied to the flap of valve 114. For example, referring back to FIG. 2, the optional layer 234C described on flap 214 of valve 114 could be the PZT film or layer forming the actuator 706 for the particle removal mechanism 702. Similar to the previously discussed configuration, during operation of the particle removal mechanism 702, AC circuit 708 drives actuator 706 to apply a high frequency voltage as previously discussed. This high frequency voltage may vibrate bottom side of closed base end 710 and create a high frequency wave within nozzle 704. This high frequency wave may, in turn, push liquid particles 713 out the open end 712 to the ambient environment 112 as shown in FIG. 10. As previously discussed, valve 114 is closed during operation of actuator 706 therefore the only direction liquid particles 713 can be driven is out open end 712 to ambient environment 112. In this aspect, it is desirable for valve 114 to be in a closed configuration (e.g., port 720 is closed) during operation of particle removal mechanism 702. When particle removal mechanism 702 is not being used, valve 114 may be in an open configuration (e.g., port 720 is open) such that the interior volume or chamber 106 is open to the ambient environment 112.

It should further be understood that while particle removal mechanism 702 is illustrated in FIGS. 7-10 in combination with the particle removal mechanism 122 described in reference to FIGS. 2-6, particle removal mechanism 122 may be optional and omitted from FIGS. 7-10 such that particle removal mechanism 702 is the only particle removal mechanism used in combination with valve 114 in this configuration. In other words, it should be understood that particle removal mechanisms 122 and/or 702 may be used alone or in combination as desired. In this aspect, the various components, aspects and/or mechanisms described in FIGS. 1-10 should be understood as illustrative and any one or more of the illustrated aspects, and/or mechanisms may be optional, may be omitted, and/or may be combined with aspects from other drawings they may or may not be illustrated in.

Figure 11:
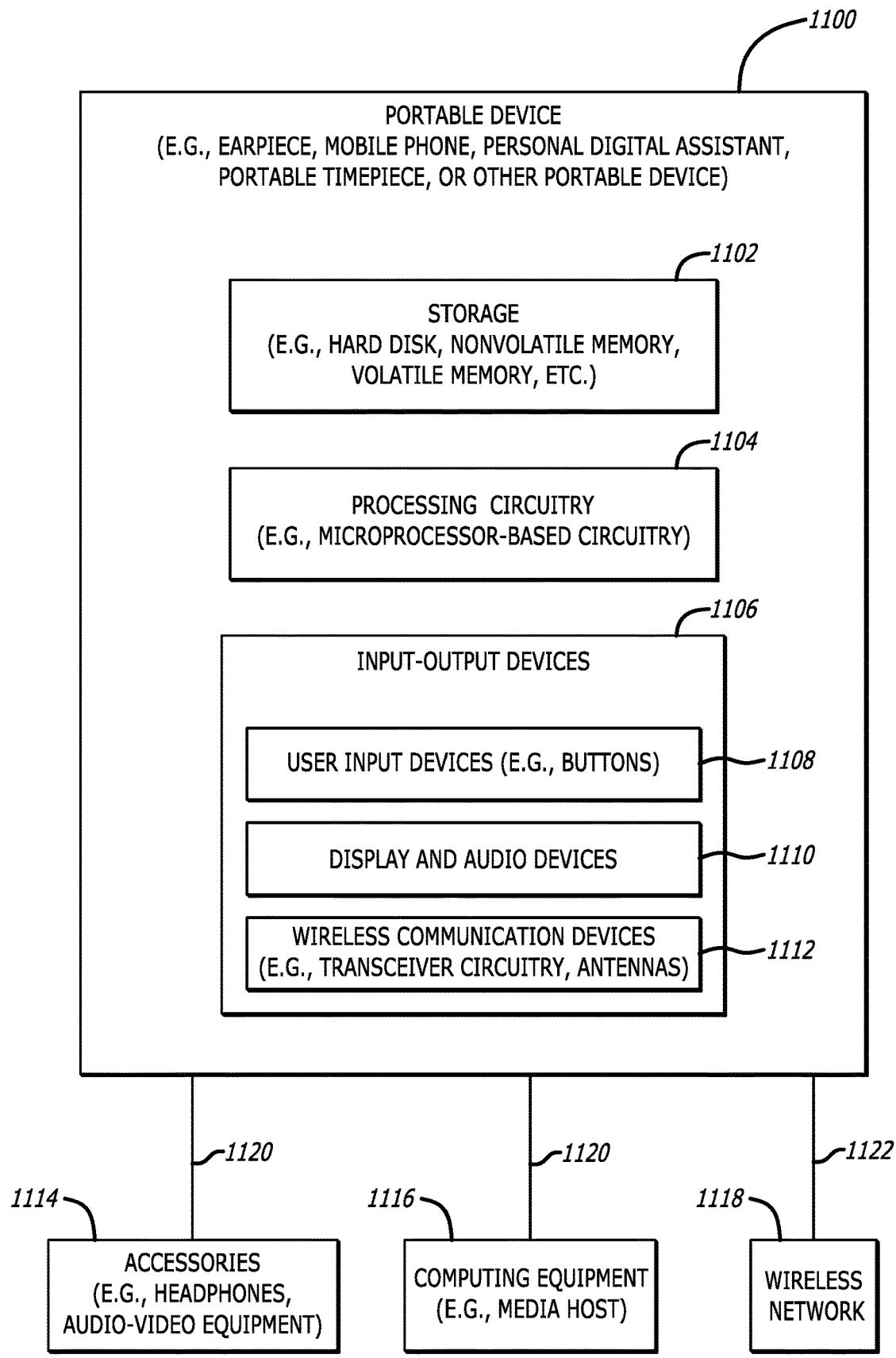
FIG. 11 illustrates a block diagram of one aspect of an electronic device within which a transducer including the particle removal mechanism and valve assembly of FIG. 1-FIG. 10 may be implemented.

FIG. 11 illustrates a block diagram of one aspect of an electronic device within which the previously discussed transducer and/or valve assembly may be implemented. As shown in FIG. 11, device 1100 may be any type of portable device within which a transducer and/or valve assembly disclosed herein may be desired, for example, an earpiece (e.g., in-ear earpiece, hearing aid or the like), mobile phone, personal digital assistant, portable timepiece or other portable device. Device 1100 may include storage 1102. Storage 1102 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 1104 may be used to control the operation of device 1100. Processing circuitry 1104 may be based on a processor such as a microprocessor and other suitable integrated circuits. With one suitable arrangement, processing circuitry 1104 and storage 1102 are used to run software on device 1100, such as internet browsing applications, voice-over-internet-protocol (VOIP) telephone call applications, email applications, media playback applications, operating system functions, etc. Processing circuitry 1104 and storage 1102 may be used in implementing suitable communications protocols. Communications protocols that may be implemented using processing circuitry 1104 and storage 1102 include internet protocols, wireless local area network protocols (e.g., IEEE 802.11 protocols—sometimes referred to as Wi-Fi®), protocols for other short-range wireless communications links such as the Bluetooth® protocol, protocols for handling 3G or 4G communications services (e.g., using wide band code division multiple access techniques), 2G cellular telephone communications protocols, etc.

To minimize power consumption, processing circuitry 1104 may include power management circuitry to implement power management functions. For example, processing circuitry 1104 may be used to adjust the gain settings of amplifiers (e.g., radio-frequency power amplifier circuitry) on device 1100. Processing circuitry 1104 may also be used to adjust the power supply voltages that are provided to portions of the circuitry on device 1100. For example, higher direct-current (DC) power supply voltages may be supplied to active circuits and lower DC power supply voltages may be supplied to circuits that are less active or that are inactive. If desired, processing circuitry 1104 may be used to implement a control scheme in which the power amplifier circuitry is adjusted to accommodate transmission power level requests received from a wireless network.

Input-output devices 1106 may be used to allow data to be supplied to device 1100 and to allow data to be provided from device 1100 to external devices. Display screens, microphone acoustic ports, speaker acoustic ports, and docking ports are examples of input-output devices 1106. For example, input-output devices 1106 can include user input-output devices 1108 such as buttons, touch screens, joysticks, click wheels, scrolling wheels, touch pads, keypads, keyboards, microphones, cameras, etc. A user can control the operation of device 1100 by supplying commands through user input devices 1108. Display and audio devices 1110 may include liquid-crystal display (LCD) screens or other screens, light-emitting diodes (LEDs), and other components that present visual information and status data. Display and audio devices 1110 may also include audio equipment such as speakers and other devices for creating sound. Display and audio devices 1110 may contain audio-video interface equipment such as jacks and other connectors for external headphones and monitors.

Wireless communications devices 1112 may include communications circuitry such as radiofrequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Representatively, in the case of a speaker acoustic port, the speaker may be associated with the port and be in communication with an RF antenna for transmission of signals from the far end user to the speaker.

Returning to FIG. 11, device 1100 can communicate with external devices such as accessories 1114, computing equipment 1116, and wireless network 1118 as shown by paths 1120 and 1122. Paths 1120 may include wired and wireless paths. Path 1122 may be a wireless path. Accessories 1114 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 1116 may be any suitable computer. With one suitable arrangement, computing equipment 1116 is a computer that has an associated wireless access point (router) or an internal or external wireless card that establishes a wireless connection with device 1100. The computer may be a server (e.g., an internet server), a local area network computer with or without internet access, a user's own personal computer, a peer device (e.g., another portable electronic device), or any other suitable computing equipment.

Wireless network 1118 may include any suitable network equipment, such as cellular telephone base stations, cellular towers, wireless data networks, computers associated with wireless networks, etc. For example, wireless network 1118 may include network management equipment that monitors the wireless signal strength of the wireless handsets (cellular telephones, handheld computing devices, etc.) that are in communication with network 1118.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. For example, any one or more of the aspects described and shown in the drawings may be option, may be omitted, and/or may be combined with aspects shown in other drawings. The description is thus to be regarded as illustrative instead of limiting. For example, although particle removal mechanism 122 is described as used for removal of solid particles and particle removal mechanism 702 is described as used for removal of liquid particles, mechanisms 122 and 702 could be used for removal of any type of particle. In addition, although particle removal mechanisms 122 and 702 are described in combination with valve 114, they could be used to remove particles near any of the other valves 116, 118 described in FIG. 1, or structures other than a valve. Still further, although a speaker is specifically disclosed herein, the valve disclosed herein could be used with other types of transducers, for example, microphones. In addition, in some aspects, the valve could be used to open/close the opening to an acoustic resonator or attenuator coupled to a transducer. Still further, although a portable electronic device such as a mobile communications device is described herein, any of the previously discussed valve and transducer configurations may be implemented within a tablet computer, personal computer, laptop computer, notebook computer, headphones and the like. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A portable electronic device comprising:
   an enclosure having an enclosure wall that forms an interior chamber containing a transducer and a valve operable to open or close a vent to the interior chamber; and
   a particle removal mechanism coupled to the valve that is operable to drive particles away from the valve upon application of a current.

2. The portable electronic device of claim 1 wherein the particle removal mechanism comprises an alternating current circuit operable to apply a current that deforms a moving component of the valve to at least one of a number of mechanical modes operable to remove solid particles from the valve.

3. The portable electronic device of claim 2 wherein the current is within an ultrasonic frequency range.

4. The portable electronic device of claim 2 wherein the current comprises a number of frequencies within an ultrasonic frequency range that are sequentially applied to deform the moving component.

5. The portable electronic device of claim 2 wherein the current comprises a number of frequencies within an ultrasonic frequency range that are simultaneously applied to deform the moving component.

6. The portable electronic device of claim 1 wherein the valve comprises an electrostatic valve having a flap that is deformed upon application of the current.

7. The portable electronic device of claim 1 wherein the particle removal mechanism comprises a Fourier horn coupling the vent to an ambient environment and a piezoelectric actuator that drives a liquid particle within the Fourier horn out to the ambient environment.

8. The portable electronic device of claim 7 wherein the actuator is attached to a side wall of the Fourier horn or a moving component of the valve.

9. A portable electronic device comprising:
   an enclosure having an enclosure wall that forms an interior chamber and a port to an ambient environment;
   a transducer positioned within the interior chamber and dividing the interior chamber into a front volume chamber coupling a first side of the transducer to the port and a back volume chamber coupled to a second side of the transducer;
   a valve comprising a moving component operable to open and close a vent to the interior chamber, the front volume chamber or the back volume chamber; and
   an actuator coupled to the valve and operable to actuate the moving component to deform to at least one of a number of mechanical modes operable to remove a particle from the valve.

10. The portable electronic device of claim 9 wherein the actuator comprises an alternating current circuit operable to generate an alternating current frequency within an ultrasonic frequency range to deform the moving component.

11. The portable electronic device of claim 10 wherein the alternating current circuit sequentially applies a number of frequencies within the ultrasonic frequency range to deform the moving component.

12. The portable electronic device of claim 10 wherein the alternating current circuit simultaneously applies a number of frequencies within the ultrasonic frequency range to deform the moving component.

13. The portable electronic device of claim 9 wherein the number of mechanical modes comprises a first mechanical mode actuated by application of an alternating current within a frequency range of from 20 kHz to 30 kHz.

14. The portable electronic device of claim 9 wherein the number of mechanical modes comprises a second mechanical mode actuated by application of an alternating current within a frequency range of from 30 kHz to 40 kHz.

15. The portable electronic device of claim 9 wherein the number of mechanical modes comprises a third mechanical mode actuated by application of an alternating current within a frequency range of from 40 kHz to 100 kHz.

16. The portable electronic device of claim 9 wherein the number of mechanical modes comprises a fourth mechanical mode actuated by application of an alternating current within a frequency range of from 100 kHz to 150 kHz.

17. The portable electronic device of claim 9 wherein the number of mechanical modes comprises a fifth mechanical mode actuated by application of an alternating current within a frequency range of from 150 kHz to 200 kHz.

18. The portable electronic device of claim 9 wherein the valve comprises an electrostatic valve.

19. The portable electronic device of claim 9 further comprising a Fourier horn coupling the vent to the ambient environment and a piezoelectric actuator operable to drive a liquid within the Fourier horn out to the ambient environment.

20. The portable electronic device of claim 19 wherein the piezoelectric actuator is attached to a side wall of the Fourier horn and causes a displacement of the side wall that drives the liquid out to the ambient environment.

21. A micro-electromechanical device comprising:
   a valve operable to open or close a vent to an enclosure chamber coupled to a transducer; and
   a particle removal mechanism coupled to the valve that is operable to drive particles away from the valve upon application of a current.

22. The micro-electromechanical device of claim 21 wherein the particle removal mechanism comprises an alternating current circuit operable to apply a current that deforms a moving component of the valve to at least one of a number of mechanical modes operable to remove solid particles from the valve.

23. The micro-electromechanical device of claim 22 wherein the current is within an ultrasonic frequency range and the valve comprises an electrostatic valve having a flap that is deformed upon application of the current.

24. The micro-electromechanical device of claim 21 wherein the particle removal mechanism comprises a Fourier horn coupling the vent to an ambient environment and a piezoelectric actuator that drives a liquid particle within the Fourier horn out to the ambient environment.

25. The micro-electromechanical device of claim 24 wherein the piezoelectric actuator is attached to a side wall of the Fourier horn or a moving component of the valve.

* * * * *